United States Patent [19]

Kahn et al.

[11] 4,350,711

[45] Sep. 21, 1982

[54] METHODS OF INFUSING FRUITS

[75] Inventors: Marvin L. Kahn, Williamsville; Kuttikandathil E. Eapen, West Seneca, both of N.Y.

[73] Assignee: Rich Products Corporation, Buffalo, N.Y.

[21] Appl. No.: 292,411

[22] Filed: Aug. 13, 1981

Related U.S. Application Data

[60] Continuation-in-part of Ser. No. 152,050, May 21, 1980, which is a division of Ser. No. 24,128, Mar. 26, 1979, Pat. No. 4,234,611, which is a division of Ser. No. 917,379, Jun. 20, 1978, Pat. No. 4,199,604, which is a division of Ser. No. 871,995, Jan. 24, 1978, Pat. No. 4,145,863, which is a division of Ser. No. 763,613, Jan. 28, 1978, Pat. No. 4,146,652.

[51] Int. Cl.³ .......................... A23L 1/212; A23L 1/06
[52] U.S. Cl. .................................. 426/102; 426/103; 426/331; 426/321; 426/573; 426/639; 426/565; 426/579; 426/549
[58] Field of Search ............... 426/331, 333, 321, 102, 426/103, 616, 639, 573, 658, 565, 549, 579

[56] References Cited

U.S. PATENT DOCUMENTS

| 1,560,396 | 11/1925 | Navarre | 426/102 |
|---|---|---|---|
| 1,703,730 | 2/1929 | Fraisse | 426/102 |
| 2,326,407 | 8/1943 | Steinwald | 426/102 |
| 2,326,407 | 8/1943 | Steinwald | 426/103 |
| 2,420,517 | 5/1947 | Brandner | 426/443 |
| 2,726,958 | 12/1955 | Fisher | 426/639 |
| 2,785,071 | 3/1957 | Mathews | 426/102 |
| 2,801,925 | 8/1957 | Fisher | 426/639 |
| 2,848,333 | 8/1958 | Fisher | 426/102 |
| 2,865,758 | 12/1958 | Weckel | 426/639 |
| 3,032,419 | 5/1962 | Limpert | 426/102 |
| 3,219,461 | 11/1965 | Lamb | 426/564 |
| 3,307,954 | 3/1967 | Blakemore | 426/102 |
| 3,453,118 | 7/1969 | Jobin | 426/102 |
| 3,516,838 | 6/1970 | DuPuis | 426/321 |
| 3,623,983 | 11/1971 | Mauge | 426/321 |
| 3,800,049 | 3/1974 | Larroche | 426/305 |
| 3,843,810 | 10/1974 | Fehmerling | 426/204 |
| 3,904,774 | 9/1975 | Dymza | 426/321 |
| 3,984,580 | 10/1975 | Gur-Arich | 426/639 |
| 4,041,184 | 8/1977 | Bonacina | 426/321 |
| 4,256,772 | 3/1981 | Shanbhag | 426/331 |

FOREIGN PATENT DOCUMENTS 529656  1/1921  France .......................... 426/102

Primary Examiner—Jeanette M. Hunter

[57] ABSTRACT

This application relates to methods of infusing fruits with fructose sugar solids and food products which remain now-crystalline at freezer temperatures containing such infused fruit products.

The fruit is infused by immersing it in two or more sugar containing solutes baths of gradually increasing sugar concentration so that the solids content of the fruit is increased in a step-wise and gradual manner to the level of about 32–55 percent by weight.

62 Claims, No Drawings

METHODS OF INFUSING FRUITS

CROSS-REFERENCE TO RELATED APPLICATIONS

The present application is a continuation-in-part of application Ser. No. 152,050, filed May 21, 1980; which is, in turn, a division of application Ser. No. 24,128, filed Mar. 26, 1979, now U.S. Pat. No. 4,234,611; which, in turn, is a division of application Ser. No. 917,379, filed June 20, 1978, now U.S. Pat. No. 4,199,604; which is a division of application Ser. No. 871,995, filed Jan. 24, 1978, now U.S. Pat. No. 4,145,863; which is, in turn, a division of application Ser. No. 763,613, filed Jan. 28, 1978, now U.S. Pat. No. 4,146,652.

FIELD OF THE INVENTION

This invention relates to methods of infusing fruits with sugar solids, and food products containing such infused fruit products.

BACKGROUND OF THE INVENTION

Methods of infusing fruits with sugar solutes, including fructose solutes, are disclosed in U.S. Pat. No. 4,234,611. This patent discloses the use of a single sugar containing bath to accomplish the infusion process.

The present method is directed to the use of two or more fructose sugar containing baths in order to accomplish the infusion of fruits with sugar solids. This infusion process increases the soluble solids level of the fruit to from about 32 to about 55% by weight. In accordance with the present invention, the reduction in fruit volume associated with the infusion of fruits from a sugar solids containing bath is reduced.

This is accomplished by infusing the fruit by immersing it in at least two or more solutes containing baths of gradually increasing sugar content so that the solids content of the fruit is increased in a step-wise and gradual manner, to the level of about 32–55% by weight. In each bath the sugar solids content of the bath must be greater than the water soluble solids content of the fruit which is to undergo infusion. By this method the original volume of the fruit is reduced by only about 26–38%, as a result of the infusion process.

DETAILED DESCRIPTION OF THE INVENTION

The present invention provides infused fruits, as well as fruit-containing food toppings, fruit fillings and fruit sauces. The infused fruits possess a soft and edible consistency at conventional freezer temperatures of about 10° F., and preferably at about 0° to about 12° F. Thus, they may be stored at freezer temperature (of about 10° F.) and consumed immediately after being removed from the freezer without a prior thawing period.

The fruits which may be infused in accordance with this invention include apples, cherries, strawberries, peaches, dates, pineapple, papaya, banana, nectarines, raspberries, mango, elderberries, longanberries, raisins, mellons, kiwi (sapota), grapes, plums and others. Any fruit which is capable of undergoing an osmotic exchange with a sugar solution without substantial collapse or damage to the internal cellular structure of the fruit product may be employed. Almost all fruits possess this property; however, it has been noted that the internal cellular structure of the driscoll collapses as a result of treatment with a fructose containing sugar solution. Thus, the driscoll is incapable of undergoing osmotic exchange with sugar solids.

In general, prior to infusion the fruit is de-stemmed, the core is removed and the fruit is washed and dried. The removal of the stem of a fruit is sufficient to create a site for the infusion of the sugar solids from the bath into the interstices of the fruit. However, where whole fruits are treated, additional sites may be created by pricking the skin of the fruit, or scarifying the fruit by providing longitudinal or latitudinal slits on the surface of the whole fruit. Alternatively, the fruit may be sliced, partially or entirely peeled, or sectioned into fruit pieces of the desired size, prior to the infusion step. However, the steps taken to prepare the fruit for infusion may differ as a function of the properties, or ultimate use, of the particular fruit employed.

For example, when apples are to be infused, the whole fruit may be washed, peeled and the core removed. The apple is then cut into slices of the desired size. In order to prevent browning of the peeled apple slices upon exposure to air, the apple slices may be soaked in an edible aqueous salt or acid solution, e.g., about 0.1 to about 1% or higher aqueous sodium chloride, ethylenediamine tetracetic acid or ascorbic acid solution.

When peaches are infused, the whole peach is washed, de-stemmed and the core is removed. The peach may then be cut into slices or the entire de-cored peach may be infused. Optionally, the peach skin is peeled away. The skin may be physically pared away with a knife or other conventional peeling device, or the skin of a peach (or other fruits) may be removed by immersing the fruit in an aqueous, about 3 to about 20%, and preferably about 5% caustic solution of sodium or calcium hydroxide. Browning of peeled peaches is prevented by washing the fruit, followed by a bath in about a 1% ascorbic acid solution.

When cherries are employed, they are de-stemmed and the pit is removed prior to infusion. Either sweet or sour cherries may be employed, including cherries of the following types: Morello, Montmorency, Queen Ann, Tartarian or Bing cherries.

Prior to the infusion bath, strawberries are preferably de-stemmed, the core is removed and the skin of the strawberry is scarified by providing a group of surface slits in the body of the fruit in order to enhance the infusion process.

Fruits which have been previously frozen, as well as fresh fruits, may be infused. Frozen fruits are thawed under refrigeration, and any excess water or fruit juices are drained from the fruit prior to immersing the fruit in the infusion bath.

After the preliminary treatment, the fruit is infused with sugar solids by immersing the fruit in a solute containing bath comprised of a fructose containing solution.

The amount of infusion bath employed relative to the weight of fruit treated will vary, but in general a weight ratio of fruit to infusion bath of from about 0.75:1 to about 1:1, and preferably 1:1, may be employed. During infusion the entire body of the fruit should be submerged in the bath.

The fruit is immersed in the solutes containing infusion bath until the total water soluble solids content of the fruit is from about 32 to about 55%, preferably about 40 to about 50%, and most preferably about 45% water soluble solids. The foregoing percentages are weight percents, and the percentages given throughout this specification are weight percents unless otherwise specified.

The driving force for the infusion of the sugar solutes of the infusion bath into the fruit is the osmotic pressure of the system resulting from the fact that the sugar solids concentration of the bath is greater than the water soluble solids content of the fruit prior to infusion. The rate of infusion will increase as the temperature of the system is increased and/or as the concentration of the sugars in the infusion bath is increased. All other factors being equal, as the concentration of sugar solids in the bath is increased, the rate of infusion to the 32-55% water soluble solids level in the fruit will be enhanced. However, the fruit may suffer "osmotic shock" from a rapid infusion which occurs due to a great difference in the solids content in the bath and the fruit. This "osmotic shock" may reduce the original volume of the fruit by as much as 70, and typically 40-60%.

Reduction in fruit volume loss is minimized by minimizing "osmotic shock." This is accomplished by infusing the fruit by immersing it in at least two or more sugar containing baths of gradually increasing initial sugar concentration, so that the water soluble solids concentration of the fruit is increased in a step-wise and gradual manner, to the level of about 32-55%. In each bath the sugar solids concentration must be greater than the water soluble solids concentration of the fruit which is to undergo infusion. By this step-wise infusion method the original volume of the fruit may be reduced by only about 26-38%.

The weight percent sugar solids content of each of the sequential sugar containing baths may be about 1.7 to 4.5 times as great as the weight percent water soluble solids content of the fruit which is to undergo infusion, and preferably the sugar solids content of the bath is about 2.7 to about 3.7 times as great as the solids content of the fruit at the point at which it is immersed in the bath.

Thus, for the sequential infusion of a fruit having an initial water soluble solids content of 10%, a first infusion bath having a sugar solids content of about 17 to about 45%, or 30-37%, may be employed. The fruit is immersed in the first bath until equilibrium is attained. Equilibrium is the point at which the sugar solids content of the bath and the water soluble solids content of the fruit undergoing infusion are about equal. At equilibrium the solids content of the bath and fruit will be about equal to the average of the initial sugar solids content of the bath and the initial water soluble solids content of the fruit, where the weight ratio of the fruit to liquid in the bath is about 1:1. Thus, in the example given, the fruit at equilibrium in the first bath will have a water soluble solids content of about 13:5 to about 27.5%. The bath is separated from the partially infused fruit prior to immersing the fruit in the second infusion bath.

In the second sequential bath, the partially infused fruit product obtained from the first infusion step, which in the example given has a soluble solids content of 13.5 to 27.5%, is immersed in a second bath having a sugar solids content of about 1.7 to about 4.5, preferably about 2.7 to about 3.7 times greater than the initial water soluble solids content of the partially infused fruit and equilibrium is again obtained. This infusion process may be continued by treating the fruit with one more or a series of infusion baths of constantly increasing sugar solids content, until the water soluble solids content of the fruit reaches 32-55%. However, the infusion process may be limited to the use of two, three or four infusion baths so long as about a 32-55% water soluble solids content is reached in the fruit. The following is a typical regimen for a three-bath infusion process wherein the final water soluble solids content of the infused fruit product is 53%.

TABLE I

| Bath* | Initial Water Soluble Solid Content of Fruit (%) | Sugar Solids Content of Bath (%) | Equilibrium Solids Content of Fruit (%) |
|---|---|---|---|
| 1 | 10 | 30 | 20 |
| 2 | 20 | 50 | 35 |
| 3 | 35 | 71 | 53 |

*Infusion is conducted at room temperature, the weight ratio of fruit to bath is about 1:1, and at each stage the fruit is infused for about 6-14 hours.

The sugar solids content of each bath may be adjusted so that the increase in the percent of water soluble solids content of the fruit after each bath is about equal. For any number of baths (N), this standard or "equivalent" increase in the percent water soluble solids in the fruit after each bath is given by the following formula:

$$\text{Standard increase in \% solids in fruit after each infusion} = \frac{\text{desired final water soluble solids content after baths} - \text{initial water soluble solids content of fruit}}{N}$$

Employing the foregoing formula for a three-bath process, and for a fruit having an initial water soluble solids content of 10%, and a final solids content of 55%, the initial sugar solids content of each bath may be adjusted so that after each of the three baths, the increase in water soluble solids in the fruit is about 15%. Since the percent increase in the water soluble solids content of the fruit after equilibrium is reached in the infusion bath is equal to the average of the initial sugar solids content of the bath and the initial water soluble solids content of the fruit, for a system comprised of about one part water to one part fruit by weight, the initial sugar solids content of each bath is readily adjusted to provide the desired increase in the percent solids.

It is preferable to employ three baths to complete the infusion process. Thus, the sugar solids content of the third bath is preferably adjusted to bring the solids content of the partially infused fruit product from the second bath to within the 32-55% soluble solids range.

The sugar solids component of the infusion baths may be comprised of about 35 to about 100% fructose, and preferably about 42 to about 90% fructose. The balance of the sugar solids may be comprised of dextrose or any of a number of saccharide materials including monosaccharides, disaccharides and polysaccharides and their degradation products, e.g., pentoses including adlopentoses, ketopentoses like xylose and arabinose, a deoxyaldose like rhamnose, hexoses and reducing saccharides such as aldohexoses like glucose, galactose and mannose, the ketohexoses, like sorbose, disaccharides, like lactose and maltose, non-reducing disaccharides such as a sucrose and other polysaccharides such as dextrin and raffinose, and hydrolyzed starches which contain as their constituents oligosaccharides. The balance of the sugar solids may be of a low molecular weight so as to offer a substantial effect in increasing the osmotic pressure of the sugar solution. The balance of the sugar solids may also be comprised of polyhydric alcohols such as glycerol and the like. When polyhydric alcohols are employed, they preferably comprise only about 1 to about 10% of the sugar component.

A commercially available fructose-dextrose corn syrup may be adjusted to the desired percent sugar solids by water addition, and employed as the sugar containing bath of the infusion process. The sugar solids component of suitable fructose-dextrose syrups may be comprised of about 50% dextrose, 42% fructose, 1.5% maltose, 1.5% isomaltose, and 5% high saccharides (i.e. Isosweet, CPC Corp.); or 55% fructose and 45% dextrose; or 90% fructose and 10% dextrose.

The infusion process may be performed in a batch or a continuous manner. When the process is performed in a continuous manner, the infusion bath which is separated from the infused fruit at each stage, may be passed through an evaporator to reduce its water content in order to replenish the bath back to its initial sugar solids content. For example, in the three-stage process of Table I, bath No. 1 which has an equilibrium sugar solids content of 20%, may be passed through an evaporator until the sugar solids content is once again at its initial 30% level. The 30% sugar solids infusion bath, regenerated in this manner, may then be reused as bath No. 1 in the treatment of a second batch of fruit in the three-bath infusion process shown by Table I. In a similar manner, equilibrium baths 2 and 3 may be separated from the infused fruit and subjected to evaporation, until their initial sugar solids content is once again obtained, and the bath may be reused. The baths may also be replenished to their initial sugar solids content by the addition of supplemental sugar solids. The volume of the replenished baths may be supplemented where necessary with fresh bath.

The sugar solids content of the bath, and the water soluble solids content of the fruit are determined by conventional analytical methods. For example, the soluble sugar solids content of the bath may be determined in accordance with Analytical Methods for Soluble Solids by Refractometer, AOAC, 13th Edition (1980), Refractive Index Method 31.011. The water soluble solids content of the fruit may be determined in accordance with Analytical Methods for Total Solids, AOAC, 13th Edition (1980), Total Solids Method 22.018.

When baths are employed having a sugar solids content of less than about 50%, yeast and mold growth may occur. This problem is eliminated by pasteurizing the infusion bath prior to placing the fruit in the bath. The bath may be pasteurized by any of a number of conventional pasteurization techniques including treatment with ultraviolet light, ultrafiltration techniques, ultrasonics or by heat pasteurization (to about 161° F.). Pasteurization may also be accomplished through the use of a vat for the infusion bath which includes an ultraviolet light source in the interior of the vat. Agitation of the bath during the infusion process also aids in reducing yeast and mold growth.

Various additives may be employed in the infusion bath in order to improve the texture of the final infused fruit product, or to enhance the stability of the fruit against possible leakage of the infused solutes from the fruit during storage. For example, low methoxyl pectin may be added in an amount of about 0.05 to about 0.25%, and preferably about 0.1% by weight of the infusion both. The low methoxyl pectin aids in preventing leakage of the infused solutes from the fruit. In addition, texture-improving agents, such as calcium salts (e.g. calcium hydroxide) may be added to the infusion baths to selectively stiffen the texture of a fruit which may have an undesirably soft consistency.

The multiple bath infusion process is preferably conducted at room temperature, although the temperature may range from about 45° to about 120° F. As an alternative to a sequential infusion process, the fruit may be infused by treatment in a single bath by immersing the fruit in an infusion bath at room temperature, followed by a period of immersion at conventional refrigerator temperatures of about 34–48° F., e.g., preferably about 40° F. The processing time required to reach a water soluble solids content in the fruit of about 32 to about 55% will vary depending upon a number of factors including the sugar solids content of the bath, the temperature, and the porosity of the fruit undergoing infusion. In general, however, the infusion process may require from about 36 to 60 hours, for example, 24 hours at room temperature, and about 12 to about 36 hours at refrigerator temperatures of about 40° F. Undesirable enzymatic browning of the fruit is avoided by carrying at least a portion of the infusion period at refrigerator temperatures, although the entire process may be conducted at room temperatures.

In order to reduce processing time the infusion process may be carried out at elevated temperatures, for example, from about 150° F.–225° F. For example, pricked raisins may be placed in a hot bath (220°–225° F.) of fructose containing syrup for a short time, i.e., 5 minutes, which induces the removal of water from the pricked raisins with consequent swelling thereof. The raisins are then cooled to about 125°–150° F., and maintained at this temperature for a few hours, e.g., 1–2 hours.

A reduction in the time required to complete the infusion process is accomplished by heating the fruit to elevated temperatures under vacuum conditions. For example, sliced apples in a fructose corn syrup (e.g. 71% sugar solids) bath may be infused to a 35 to 45% solids content within about 30 to 45 minutes by heating them in a vacuum cooking kettle at about 80 to about 110° F. and 20 to 28 inches of mercury. For example, at 100° F. and 28 inches mercury, the following time periods are required to reach a 38–40% water soluble solids content:

TABLE II

| Fruit (Frozen or thawed) | Infusion time in minutes to a 38–40% solids content (1:1 weight ratio of fruit to high fructose corn syrup bath, 71% sugar solids): |
|---|---|
| Sliced apples | 30–45 |
| Sliced peaches | 60–75 |
| Blueberries | 60–90 |
| Pitted cherries | 90–150 |
| Strawberries | 180–280 |

Upon completion of the solute infusion step, the bath is drained from the fruit. The separated solute bath may be reconstituted (i.e., by evaporation or by the addition of sugar) to appropriate sugar solids levels, and recycled for use in the infusion of a second batch of fruit.

Where a single infusion bath is employed, the bath is preferably comprised of high fructose corn syrups, such as those comprised of approximately 70 to 80% sugar solids, wherein the sugar solids are comprised of about 35 to 100% fructose sugar, preferably about 40 to about 90% fructose sugar. Fructose-dextrose corn syrups which may be employed as the infusion bath includ Isosweet, CPC Corp., which comprises 29% water and 71% sugar, wherein the sugar comprises 50% dextrose, 42% fructose, 1.5% maltose, 1.5% isomaltose and 5% higher saccharides. A suitable high fructose-dextrose syrup contains 23.5% water, with the remaining portion comprising 55% fructose and 45% dextrose. Fructose concentrates comprising 20% water and 80% sugar solids of which 90% of the sugar is fructose may also be employed.

The infused fruit products produced by the infusion process of this invention may be dehydrated by any of a number of conventional processes including freeze-drying, vacuum-drying, sun-drying, etc. The dehydrated infused fruits of this invention have extended textural and microbiological stability at ambient temperatures. They have a residual moisture content of about 15 to 28%, which is about 17 to about 15% greater than the moisture content of conventional dehydrated fruit. The greater residual moisture of the dehydrated fruits of this invention render them more readily re-hydratable. Thus, fruits such as raisins, cherries, etc. may be added to dry cereals and when milk is added, the fruit readily re-hydrates, and at the same time the infused sugar solids leach into the milk. The sugar solids from the fruit are sufficient to sweeten the cereal, eliminating the necessity for the addition of supplemental sweeteners to the cereal. The cereal base may comprise corn flakes, bran flakes, rice cereals (i.e. Rice Krispies), etc.

The bath which is separate from the fruit upon completion of the infusion process is in itself a useful food product, or food base which may be further processed into a desired food product. During the infusion process fruit juices infuse into the bath providing it with a fruit flavor. For example, the post-infusion bath may be employed as a milk additive or pancake additive. Moreover, the bath combined with the infused fruit may be employed as fruit-syrup food topping or sauce, or it may be mixed with ice cream, yogurt products, etc.

The post-infusion bath may also be treated with any of a number of conventional thickeners, and utilized alone or in combination with the infused fruit product as a pie or donut filling, as an additive to yogurt or yogurt mixes, as an ice-cream or cake topping, as a pastry filling, as well as a sauce or pudding product, etc.

Starches may be employed to thicken the post-infusion bath. The starches employed to treat the bath may be chemically modified starches from potato, arrowroot, corn, rice, wheat, maize, sorghum and waxy sorghum. Tapioca starch may also be employed. In general from about 1 to about 4½% starch may be added to the infusion bath to adjust it to the desired viscosity. In addition to, or in the alternative to, starches, gums may be employed as thickeners; e.g. alginates, carageenans, locust beam gum, guar gum and cellulose gums.

Other conventional food additives may be added to the post-infusion bath. Typical of such ingredients are flavoring agents, salt, fats and emulsifiers, colorants, vitamins, minerals or the like. Suitable flavorings can be employed to impart vanilla, cream, chocolate, coffee, maple, spice, mint, butter, caramel, fruit and other desired flavorings.

The infused fruit products described herein, including those products derived from the post-infusion bath, may be employed in combination with food products which are spoonable and/or flowable, and substantially non-crystalline at freezer temperatures of about −5° F. to about 10° F. Food products having these properties comprise about 15 to about 45% water, sugar in a ratio to water of about 1:1 to 2:1, preferably 1.5 to 1:1, and the amount of fructose plus dextrose in the sugar component should be at least about 50%–75% based on the total sugar content of the formulation. In addition, minor but effective amounts of emulsifiers, flavoring and/or stabilizers may be added. Foods of this type include puddings, yogurts, donuts, cakes, ice creams, pancake batters, cream-type products, pie and donut fillings, non-dairy creamers, flour-based batters, etc. Such products are disclosed by the following U.S. patents which are incorporated herein as though fully set forth below: U.S. Pat. Nos. 4,234,611, 4,146,652 4,154,863, 4,199,605, 4,199,604, 4,248,902, 4,235,936, 4,237,146, 4,244,976, 4,244,977 and 4,220,671. For example, the infused fruits described herein are well suited for incorporation into the puddings, apple pie fillings, and donut fillings, described in U.S. Pat. No. 4,234,611 which is incorporated herein by reference. Moreover, the infused fruits in combination with the post-infusion bath may be employed as fillings for bakery products, donuts, pie-crusts, etc., which remain spoonable and/or flowable and non-crystalline at conventional freezer temperatures.

Food formulations and ranges of ingredients do not readily permit of fixed parameters because of variations in perople and places. The following examples are not intended to be limiting, but rather illustrative of some approaches taken and, of course, may be varied in accordance with the spirit and scope of this description.

EXAMPLE 1

Infused Strawberries 87.0 lbs. of fresh strawberries were de-stemmed and slashed horizontally to encourage infusion. The strawberries were mixed with 172.1 lbs. of Isosweet 100 (29% water and 71% sugar comprised of 50% dextrose, 42% fructose, 1.5% maltose, 1.5% isomaltose and 5% higher saccharides) and infused for 24 hours at room temperature and at 40° F. for three days. The fruit was separated from the syrup by draining, and the fruit was stored in a freezer. The fruit contained about 40% infused water soluble solids.

EXAMPLE 2

Infused Strawberries

300 Grams of fresh strawberries were de-stemmed and needle-pricked once axially. The fruit was mixed with 300 grams of Isosweet 100, then heated to 100° F. at 28" of Hg. over 35 minutes and held at 100° F. for 180 minutes. The fruit contained about 35% infused solids at this point, and it was separated from the syrup by draining and placed in a freezer.

EXAMPLE 3

Strawberry Pie Filling

One-fifth of the infusion liquid remaining after 3,604 grams of strawberries are infused with 3,604 grams of Isosweet 100 by the procedure of Example 1 or Example 2 above is blended with a mixture of 263 grams Thin and Thik 99 starch, 7.5 grams of salt, 15 grams of citric acid, 7.5 grams of Avicel 591, and 0.15 grams of strawberry shade coloring. Four-fifths of this slurry is combined with the remaining untreated post-infusion liquid and heated to 195° F. for 2 minutes. The mixture is cooled to 110° F. as the infused fruit is added. When the mixture reaches 110° F., the remaining one-fifth of the slurry is added and the resultant filling is cooled to room temperature. Avicel 591 is a cellulose gell (a microcrystalline cellulose) thickener, and Thin and Thik 99 is a modified waxy maize starch.

EXAMPLE 4

Infused Blueberries

Frozen blueberries were thawed and the resultant syrup drained off. 300 grams of these blueberries were mixed with 300 grams of Isosweet 100, heated to 100° F. over 45 minutes at 28" Hg, then held at 100° F. in vacuo an additional 90 minutes. The fruit contained about 38% infused solids at this point and was separated from the syrup by draining and then stored in a freezer.

EXAMPLE 5

Infused Apples

500 Grams of fresh apple slices were mixed with 500 grams of Isosweet 100 and heated at 100° F. for 60 minutes at 28" Hg. The fruit contained about 48.25% infused solids at this point and was separated from the syrup by draining and then stored at freezer temperatures.

EXAMPLE 6

Apple Pie Filling 3,593 Grams of fresh apples were peeled, cored, sliced, steam blanched and washed in cold water. The apple pieces were mixed with 3,593 grams of Isosweet 100, and infused 28 hours at room temperature, then held in a cooler at about 40° F. with occasional stirring for five days. The apple pieces were drained and one-quarter of the resultant infusion liquid blended with 263 grams of Thin and Thik 99 Starch, 16.5 grams salt, 6.8 grams of cinnamon, 2.3 grams nutmeg, 18.8 grams of malic acid and 7.5 grams of Avicel 591. One-fifth of this slurry was mixed with the remaining infusion liquid and heated to 195° F. for 2 minutes. This mixture was cooled to 100° F. and the infused apples were added. The mixture is then cooled below 110° F. and the remaining portion of the slurry added.

EXAMPLE 7

Infused Cherries 60 lbs. of fresh cherries were pitted and infused with 60 lbs. of Isosweet 100 by soaking for 24 hours at room temperature and 24 hours of soaking at 40° F. The fruit contained 38% soluble solids and was separated from the syrup by draining and then stored in a freezer.

EXAMPLE 8

Blueberry Topping

A mixture of 25 grams Col Flo 67 (a modified waxy maize starch), 3.0 grams of Avicel RC 591, 2.0 grams of Hercules 12CB LM Pectin, 5.0 grams salt, 4.0 grams of malic acid, 4.0 grams of citric acid, 0.2 grams of anhydrous monocalcium phosphate and 57 grams of sucrose were mixed and slurried with 550 grams of the infusion liquid obtained by the procedure of Example 4. The resultant slurry was heated at 185-195° F. for five minutes. 350 grams of infused blueberries prepared according to the procedure of Example 4 were added as the mixture was cooled to room temperature.

EXAMPLE 9

Strawberry Topping

A mixture of 750 grams Polargel 10, 90 grams Avicel RC591, 60 grams 12CB LM Pectin, 150 grams of salt, 150 grams of malic acid, 180 grams of citric acid, 6.0 grams of calcium phosphate, and 1,710 grams of sucrose were mixed and slurried with 16,500 grams of infusion syrup obtained by the procedure of Example 2. The slurry was cooled at 185°-195° F. for five minutes. 10,500 grams of strawberries infused by the procedure of Example 2 were added as the mixture was cooled to room temperature. The resultant topping could be used at room temperature or frozen. Polargel 10 is a modified waxy maize starch of amylopectin origin.

EXAMPLE 10

Three-Bath Apple Infusion 1,000 Grams of sliced apples were immersed in 1,000 grams of a 40 Brix (40% sugar solids) solution prepared by diluting a fructose-dextrose corn syrup with water. The fructose-dextrose corn syrup was Isosweet 100, which comprises 29% water and 71% sugar solids (i.e., 50% dextrose, 42% fructose, 1.5% maltose, 1.5% isomaltose and 5% higher saccharides). The apples were immersed in the bath, with manual stirring for a period of 10 hours. At this point the Brix of the bath was reduced to 22%, and the bath was drained from the vat housing the apples. The infused apples weighed 898 grams.

The 898 grams of apples recovered from the first bath were immersed in a second bath of 800 grams of Isosweet 100 fructose-dextrose syrup which had been diluted to 50° Brix (i.e., 50% sugar solids) with water. After 14 hours the Brix of the bath reached 33°. The apples were separated from the bath, and weighed. The weight of the infused apples was 820 grams.

The 820 grams of apples recovered from the second infusion bath were immersed in a third bath of 71° Brix (71% sugar solids) Isosweet fructose-dextrose syrup. After 13 hours, the Brix of the bath was 46.8°, and the infused fruit was separated from the bath and weighed. The finally infused apples weighed 745 grams.

The infusion was conducted at room temperature, with frequent stirring to prevent formation of a layer of diluted/concentrated portions of syrup, and microbial spoilage.

The infused fruit products of this invention have a water soluble solids content of from about 32 to about 55%. They may be stored at conventional refrigerator temperatures, although storage at freezer temperatures is preferred.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the scope of this invention and the following claims.

We claim:

1. A method of infusing fruits capable of undergoing osmotic exchange with sugar solids comprising:

a. bathing a fruit in a first sugar containing bath wherein said sugar component of said bath is comprised of about 35 to about 100% by weight fructose, wherein the water soluble solids content of said fruit is increased by the infusion of sugar solids from the bath into the fruit, and b. separating the infused fruit from said first bath, and c. bathing said infused fruit in at least one more sugar containing bath wherein said sugar component of said bath is comprised of about 35 to about 100% by weight fructose to further increase the water soluble solids content of said infused fruit product to about 32 to about 55% by weight, wherein the increase in said water soluble solids content of said fruit after treatment in said first bath and the increase in said water soluble solids content of said fruit after treatment in said at least one more bath are adjusted to provide an infused fruit product having a volume which is at least about 62% of the volume of said fruit prior to being infused with said sugar solids.

2. The method according to claim 1 wherein during each bathing said fruit is infused with sugar solids from said bath until equilibrium is reached between the sugar solids content of said bath and the water soluble solids content of said fruit.

3. The method according to claim 2 wherein the initial sugar solids content of each of said baths is about 1.7 to about 4.5 times as great as the initial water soluble solids content of said fruit which is bathed in said bath, and wherein said infused fruit product is substantially non-crystalline at freezer temperatures of from about 0° to about 12° F.

4. The method according to claim 1 wherein in said first bath the initial sugar solids content of said first bath is about 2.7 to about 3.7 times as great as the initial water soluble solids content of said fruit prior to treatment in said bath, and said fruit after treatment in said first bath is separated from said first bath and then said fruit is further infused with sugar solids from a second sugar containing bath, wherein the initial sugar solids content of said second bath is about 2.7 to about 3.7 times as great as the water soluble solids content of said fruit after it has been treated in said first bath, and said fruit after treatment in said second bath is separated from said bath and then said fruit is further infused with sugar solids from a third sugar containing bath, wherein the initial sugar solids content of said third bath is about 2.7 to about 3.7 times as great as the water soluble solids content of said fruit which has been treated in said second bath.

5. The method according to claim 4 wherein the sugar solids content of said first and said second bath is adjusted so that the increase in the percent water soluble solids content of said fruit after treatment in said first bath is about equal to the increase in the water soluble solids content of said fruit after treatment in said second bath.

6. The method according to claim 4 wherein said bath is agitated during the infusion of said fruit.

7. The method according to claim 1 or claim 4 wherein said fruit is selected from the group consisting of strawberries, apples and cherries.

8. The method according to claim 4 wherein said first bath comprises an aqueous solution of a fructose-dextrose syrup, said first bath having about a 40% by weight sugar solids content; and said sugar solids are comprised of about 42% by weight fructose; and wherein said second bath comprises an aqueous solution of a fructose-dextrose syrup, said second bath having about a 50% by weight sugar solids content, and said sugar solids comprise about 42% by weight fructose; and wherein said third bath comprises a fructose-dextrose syrup having about a 17% sugar solids content, said sugar solids comprising about 42% fructose.

9. The method according to claim 1 or claim 2 or claim 3 wherein the sugar component of each of said baths includes dextrose sugar.

10. The method according to claim 4 or claim 5 wherein each of said baths includes dextrose sugar.

11. The method according to claim 1 or claim 2 or claim 3 wherein said sugar component of each of said baths comprises about 42 to 90% fructose by weight.

12. The method according to claim 4 or claim 5 wherein said sugar component of each of said baths is comprised of about 42 to 90% fructose by weight.

13. The method according to claim 4 or claim 5 wherein said sugar component of each of said baths is comprised of about 42 to about 90% fructose, and about 10 to about 50% dextrose, by weight.

14. The method according to claim 1 or claim 2 or claim 4 or claim 8 further comprising the step of pasteurizing the sugar containing baths.

15. The method according to claim 1 wherein said first bath after separation from a first batch of infused fruit is replenished to its initial sugar solids content, and said replenished first bath is employed in the infusion of a second batch of fruit in accordance with the method of claim 1.

16. The method according to claim 4 conducted in a continuous manner, wherein said first bath, said second, and third baths, after being separated from a first batch of infused fruit, are each replenished to their respective initial sugar solids contents, and then said replenished baths are employed in accordance with the method of claim 4 in the infusion of a second batch of fruit.

17. The method according to claim 15 or claim 16 wherein said baths are replenished by evaporation of water until said initial solids content of said bath is reached.

18. The method according to claim 1 or claim 2 wherein said fruit is selected from the group consisting of apples, cherries, strawberries, peaches, dates, pineapple, papaya, banana, nectarines, raspberries, mango, elderberries, loganberries, raisins, mellons, kiwi, grapes and plums.

19. The method according to claim 18 wherein said fruit is apples.

20. The method according to claim 18 wherein said fruit is cherries.

21. The method according to claim 18 wherein said fruit is raisins.

22. The method according to claim 18 wherein said fruit is strawberries.

23. The method according to claim 15 or claim 16 wherein said fruit is selected from the group consisting of strawberries, apples, raisins and cherries.

24. The method according to claim 1 or claim 2 further including the step of dehydrating said infused fruit product.

25. The method according to claim 4 or claim 15 or claim 16 further comprising the step of dehydrating said infused fruit product.

26. The method according to claim 24 further comprising the step of combining said dehydrated fruit with a cereal base.

27. The method according to claim 25 further comprising the step of combining said dehydrated fruit with a cereal base.

28. The method according to claim 27 wherein said fruit is raisins.

29. The method according to claim 1 or claim 2 wherein said infused fruit product is combined with a food product which is substantially non-crystalline at freezer temperatures of about 10° F., said food product being comprised of about 15 to about 45% water and sugar in a ratio to water of about 1:1 to about 2:1, wherein said sugar component is comprised of at least about 50% by weight fructose plus dextrose.

30. The method according to claim 4 or claim 15 or claim 16 wherein said infused fruit product is combined with a food product which is substantially non-crystalline at freezer temperatures of about 10° F., said food product being comprised of about 15 to about 45% water, and sugar in a ratio to water of about 1:1 to about 2:1, wherein said sugar component is comprised of at least about 50% by weight fructose plus dextrose.

31. The method according to claim 29 wherein said food product is selected from the group consisting of puddings, pie fillings, donut filling, ice cream, pancake batter, cake batter and yogurt.

32. The method according to claim 30 wherein said food product is selected from the group consisting of puddings, pie fillings, donut filling, ice cream, pancake batter, cake batter and yogurt.

33. The method according to claim 1 wherein the initial sugar solids concentration of said first bath is greater than the initial sugar solids concentration of said at least one more bath.

34. The method according to claim 18 further comprising the step of dehydrating said fruit.

35. The method according to claim 34 further comprising the step of combining said dehydrated fruit with a cereal base.

36. The method according to claim 34 wherein said dehydrated fruit is apples.

37. The method according to claim 34 wherein said dehydrated fruit is cherries.

38. The method according to claim 34 wherein said dehydrated fruit is strawberries.

39. The method according to claim 34 wherein said dehydrated fruit is peaches.

40. The method according to claim 34 wherein said dehydrated fruit is dates.

41. The method according to claim 34 wherein said dehydrated fruit is pineapple.

42. The method according to claim 34 wherein said dehydrated fruit is papaya.

43. The method according to claim 34 wherein said dehydrated fruit is bananas.

44. The method according to claim 34 wherein said dehydrated fruit is nectarines.

45. The method according to claim 34 wherein said dehydrated fruit is raspberries.

46. The method according to claim 34 wherein said dehydrated fruit is mango.

47. The method according to claim 34 wherein said dehydrated fruit is elderberries.

48. The method according to claim 34 wherein said dehydrated fruit is raisins.

49. The method according to claim 34 wherein said dehydrated fruit is mellons.

50. The method according to claim 34 wherein said dehydrated fruit is kiwi.

51. The method according to claim 34 wherein said dehydrated fruit is grapes.

52. The method according to claim 34 wherein said dehydrated fruit is plums.

53. The method according to claim 23 further comprising the step of dehydrating said fruit.

54. The method according to claim 53 further comprising the step of combining said dehydrated fruit with a cereal base.

55. The method of claim 54 wherein said dehydrated fruit is strawberries.

56. The method according to claim 54 wherein said dehydrated fruit is apples.

57. The method according to claim 54 wherein said dehydrated fruit is cherries.

58. The method according to claim 24 wherein said dehydrated fruit is blueberries.

59. The method according to claim 25 wherein said dehydrated fruit is blueberries.

60. The method according to claim 34 wherein the the cereal base is selected from the group consisting of corn flakes, bran flakes and a rice cereal.

61. The method according to claim 26 wherein the cereal base is selected from the group consisting of corn flakes, bran flakes and a rice cereal.

62. The method according to claim 27 wherein the cereal base is selected from the group consisting of corn flakes, bran flakes and a rice cereal.

* * * * *

UNITED STATES PATENT AND TRADEMARK OFFICE
CERTIFICATE OF CORRECTION

PATENT NO. : 4,350,711
DATED : September 21, 1982
INVENTOR(S) : Marvin L. Kahn et al It is certified that error appears in the above—identified patent and that said Letters Patent is hereby corrected as shown below:

ON THE TITLE PAGE,

In the Abstract, line 3, change "now-crystalline" to --non-crystalline--.

Col. 7, line 2, change "includ" to --include--.

Col. 12, line 6, change "17%" to --71%--.

Col. 12, line 47, change "mellons" to --melons--.

Col. 14, line 18, change "mellons" to --melons--.

Signed and Sealed this

First Day of March 1983

[SEAL]

Attest:

GERALD J. MOSSINGHOFF

Attesting Officer

Commissioner of Patents and Trademarks